J. M. Hall.
Rotary Cultivator.
Nº 17,091. Patented Apr. 21, 1857.
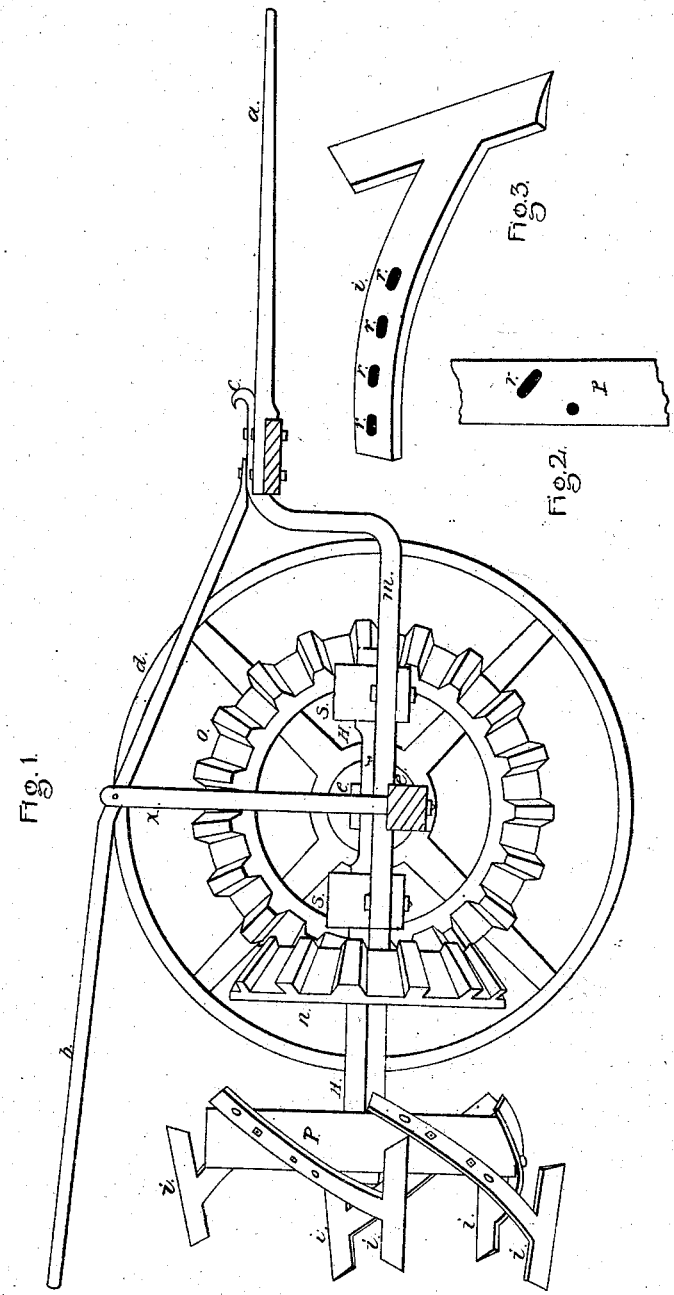
Witnesses:
Inventor:
John M. Hall

UNITED STATES PATENT OFFICE.

JOHN M. HALL, OF WARRENTON, GEORGIA.

IMPROVED COTTON-CULTIVATOR.

Specification forming part of Letters Patent No. 17,091, dated April 21, 1857.

*To all whom it may concern:*

Be it known that I, JOHN M. HALL, of Warrenton, in the county of Warren and State of Georgia, have invented a new and Improved Rotary Hoe for the purpose of chopping out cotton, to be worked by horse-power; and I do hereby declare that the following is a full and exact description thereof, reference being had to the accompanying drawings, and to the letters of reference marked thereon.

The nature of my invention consists in making my hoes in such a manner and so attaching them to the wheel that they shall enter the ground at regular spaces, leaving a regular space between each cut, and at any required depth.

To enable others skilled in the art to make and use my invention, I will proceed to describe its construction and operation.

To an ordinary wheel I attach a bevel-gear wheel of such diameter and number of teeth as shall, when acting upon the bevel-pinion on the horizontal shaft of the hoe, give the requisite number of chops or cuts to each revolution of the carriage-wheels. I construct my carriage with two wheels and an axle of sufficient length to give a distance between the wheels of not less than that between the rows of cotton, curving the axle downward sufficient to allow the horizontal shaft to be on a line with the center of the wheels.

Attached to the axle are bars extending sufficiently back of the axle to receive the bearings of the journals of the horizontal shaft. To these bars, which are on the front bent into a goose-neck shape, are attached the shafts for the horse, in such a manner that he shall not walk on the rows.

From the front of the carriage, and secured by braces from the axle, is a handle, $b$, to guide the carriage on uneven ground.

On the end of the horizontal shaft I attach my hoe-wheel, the face of the hoe-wheel being of sufficient breadth for the size and number of hoes employed. The shanks of the hoes are made of iron, the cutting part of steel, and are secured to the wheel by two bolts each. The holes in the shanks of the hoes are made from one to three inches in length, in order to regulate the depth of the cut into the ground. The holes in the face of the bolt are, one the size of the bolt, and the other from two to three inches in length diagonally across the face of the wheel, to regulate the angle of the cut and unequal wear of the hoes, as is more fully shown by the drawings accompanying this specification, in which—

No. 1, Figure 1 is a view of the hoe, with one wheel of the carriage taken off, the better to show all the parts. $a$ is the shafts to which the horse is attached; $c$, the hook to which is attached the whiffletree; $d$, the carriage-wheel, to which is bolted the bevel-gear wheel $o$, that imparts the rotary motion to the horizontal shaft H H by means of the bevel-pinion $n$, and to the hoe-wheel P and hoes $i$ $i$ $i$ $i$, by the forward motion of the carriage, thereby causing the hoes to enter the ground at regular intervals; S S, the boxes or bearings for the journals of the horizontal shaft H H; $e\ e$, the axle of the carriage; $m$, the iron bars secured to the axle, on which rest the bearings for the journals of the horizontal shaft, and to which are attached the shafts for the horse; $b$, the guiding-handle, secured by the braces $x$ to the carriage.

Fig. 2 is an enlarged view of one of the hoes $i$ detached from the wheel, showing its form, and the holes or slots $r\ r\ r\ r$ in the shank of the hoe for changing the depth of the cut.

Fig. 3 is a section or portion of the face of the hoe-wheel P, showing the manner by which the angles of the hoes are changed, and the unequal wear of the hoe overcome by means of the diagonal slot $r$.

What I claim as my invention, and desire to secure by Letters Patent, is—

In combination with the wheel P, the adjustable hoes $i$, constructed, arranged, and operating in the manner and for the purpose set forth.

JOHN M. HALL.

Witnesses:
M. H. WELLBORN,
HENRY W. BRUCE.